(12) United States Patent
Guo et al.

(10) Patent No.: US 7,650,981 B2
(45) Date of Patent: Jan. 26, 2010

(54) PASSENGER CONVEYOR HANDRAIL SLIDING LAYER TREATMENT

(75) Inventors: Changsheng Guo, South Windsor, CT (US); John M. Milton-Benoit, West Suffield, CT (US); John P. Wesson, Vernon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 12/096,930

(22) PCT Filed: Dec. 28, 2005

(86) PCT No.: PCT/US2005/047057

§ 371 (c)(1),
(2), (4) Date: Jun. 11, 2008

(87) PCT Pub. No.: WO2007/075162

PCT Pub. Date: Jul. 5, 2007

(65) Prior Publication Data

US 2008/0302632 A1 Dec. 11, 2008

(51) Int. Cl.
*B65G 23/22* (2006.01)
(52) U.S. Cl. .................................... 198/337
(58) Field of Classification Search .............. 198/335, 198/337
See application file for complete search history.

(56) References Cited

U.S. PATENT DOCUMENTS

| | | | | |
|---|---|---|---|---|
| 4,469,729 A | * | 9/1984 | Watanabe et al. | 198/337 |
| 5,160,009 A | * | 11/1992 | Iyoda et al. | 198/337 |
| 5,255,772 A | * | 10/1993 | Ball et al. | 198/337 |
| 6,237,740 B1 | * | 5/2001 | Weatherall et al. | 198/337 |
| 6,673,431 B1 | | 1/2004 | Ledzinski | |
| 2002/0084169 A1 | * | 7/2002 | Schulte et al. | 198/337 |
| 2005/0011735 A1 | * | 1/2005 | Durrer et al. | 198/337 |
| 2005/0173224 A1 | * | 8/2005 | Caunce | 198/337 |

OTHER PUBLICATIONS

International Search Report and Written Opinion for International application No. PCT/US05/47057 mailed Jul. 6, 2006.
International Preliminary Report on Patentability for International application No. PCT/US05/47057 mailed Feb. 2, 2007.

* cited by examiner

*Primary Examiner*—James R Bidwell
(74) *Attorney, Agent, or Firm*—Carlson, Gaskey & Olds PC

(57) ABSTRACT

A passenger conveyor handrail (30) includes a sliding fabric layer (36) having a low-friction coating (40) on at least one side (38) of the sliding fabric layer (36). One example includes the low-friction coating (40) on selected portions of the one side (38) of the sliding fabric layer (36). Another example includes a coating on both sides (38, 39) of the sliding fabric layer (36).

19 Claims, 2 Drawing Sheets

PASSENGER CONVEYOR HANDRAIL SLIDING LAYER TREATMENT

1. FIELD OF THE INVENTION

This invention generally relates to passenger conveyors. More particularly, this invention relates to sliding layers for use on handrails of passenger conveyors.

2. DESCRIPTION OF THE RELATED ART

Passenger conveyors such as escalators and moving walkways typically include moving steps or a moving belt for carrying passengers between landings at opposite ends of the conveyor. Handrails move with the steps or belt to provide a surface for passengers to stabilize themself while riding on a conveyor. Typical handrail construction includes a rubber or thermoplastic body that provides the gripping surface for passengers. An underside of the body typically is coated with a sliding fabric such as cotton or polyester. The sliding fabric facilitates the handrail sliding along a guidance.

Ideally, a sliding fabric layer would have a surface characteristic that would provide a low co-efficient of friction between the sliding layer and the guidance. Conventional handrail drive assemblies have limited the ability to incorporate a low friction sliding layer on a handrail. Conventional handrail drive assemblies use friction and pinching rollers to engage both sides of a handrail to propel it in unison with the steps or moving belt so that the handrail moves along with passengers riding on the conveyor. The requirement for friction between the handrail drive mechanism and the handrail cannot be achieved if the sliding fabric layer is too slippery. Such a "friction contradiction" (e.g., the need for a low coefficient of friction while the sliding layer rides on the guidance and a need for a high coefficient of friction as the sliding layer is engaged by the drive mechanism) has limited the choice of fabrics that are useful as a sliding fabric layer.

Another consideration in choosing a sliding fabric is ensuring good bonding between the fabric and the material used to establish the body of the handrail.

The wear on a sliding fabric layer is a major contributor to the need to repair or replace passenger conveyor handrails. There is a need for an improved arrangement that reduces the amount of wear on the sliding fabric layer to provide extended handrail life and associated cost savings. This invention addresses those needs.

SUMMARY OF THE INVENTION

An exemplary article for use as at least a portion of a passenger conveyor handrail includes a sliding fabric layer having a low friction coating on at least a portion of one side of the sliding fabric layer.

In one example, selected portions of the one side of the fabric layer are coated with the low friction coating to facilitate sliding along the guidance. Other portions of the one side of the fabric layer are not coated to facilitate proper engagement with a drive mechanism.

Another example includes a coating on two sides of the sliding fabric layer. One example includes two different coatings; one selected for low friction and the other for good bonding with the material used to establish the handrail body.

Another example includes the same coating on both sides of a sliding fabric layer.

Example application techniques for applying a low friction coating to at least a portion of one side of a sliding fabric layer include brushing, spraying or rolling on the material used to establish the low friction coating. Another example includes immersing the sliding fabric layer within the material used to establish the coating.

In one example, the sliding fabric layer is coated before the fabric is secured to the body of the handrail. In another example, the handrail is assembled with the sliding fabric layer in place before the low friction coating is applied.

The various features and advantages of this invention will become apparent to those skilled in the art from the following detailed description. The drawings that accompany the detailed description can be briefly described as follows.

DETAILED DESCRIPTION OF THE PREFERRED EMBODIMENTS

Figure 1:
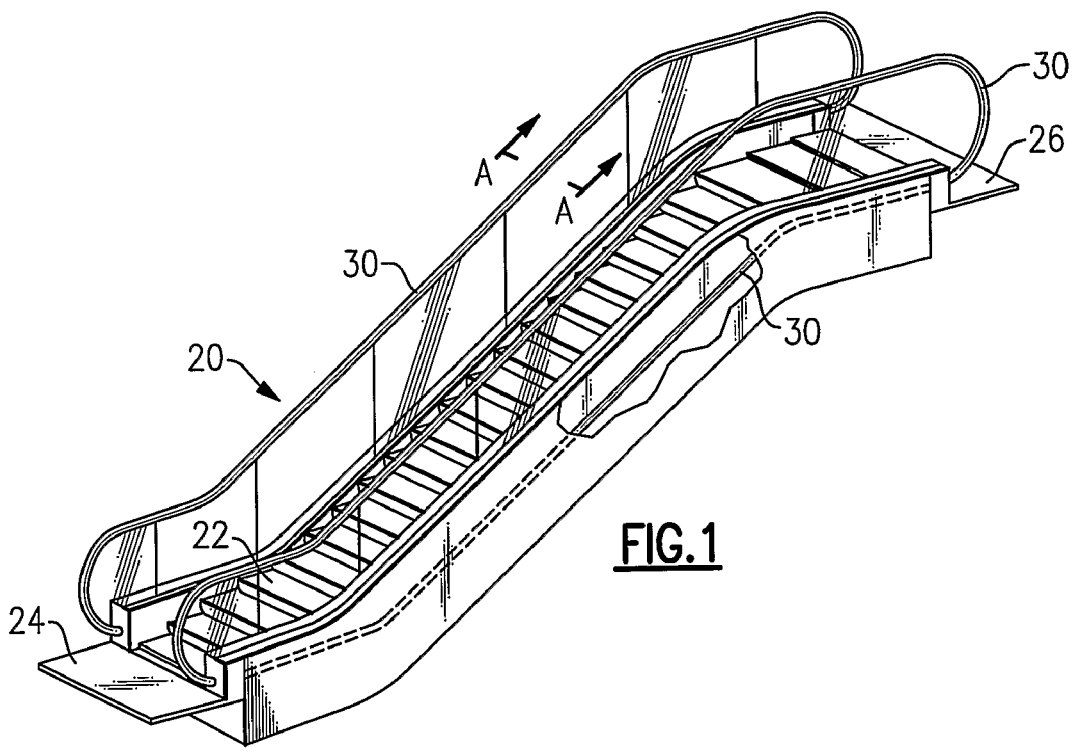
FIG. 1 diagrammatically illustrates an example passenger conveyor incorporating a handrail designed according to an embodiment of this invention.

FIG. 1 shows an example passenger conveyor 20. A plurality of steps 22 move between landings 24 and 26 to carry passengers in a desired direction. A handrail 30 follows a path along a guidance (not illustrated) to provide a surface for a passenger to hold onto as they ride the conveyor 20.

Figure 2:
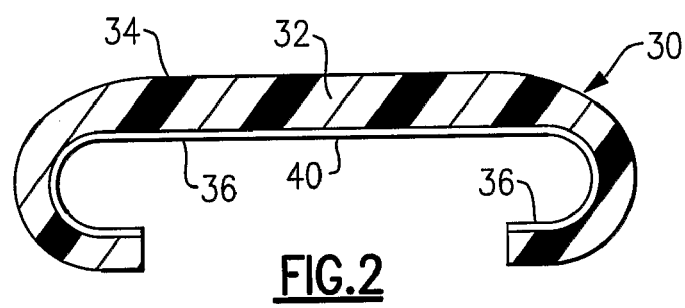
FIG. 2 is a cross-sectional illustration taken along the lines A-A in FIG. 1.

FIG. 2 shows one example handrail configuration where the handrail 30 includes a body 32 comprising a rubber or thermoplastic material, for example. The body 32 establishes a gripping surface 34 that faces in a direction to be grasped by an individual riding on the conveyor 20, for example. An oppositely, inwardly (according to the drawing) surface of the handrail body 32 has a sliding fabric layer 36 secured in place. The sliding fabric layer 36 slides along a conventional guidance (not illustrated) as the handrail moves in a known manner.

Figure 3:
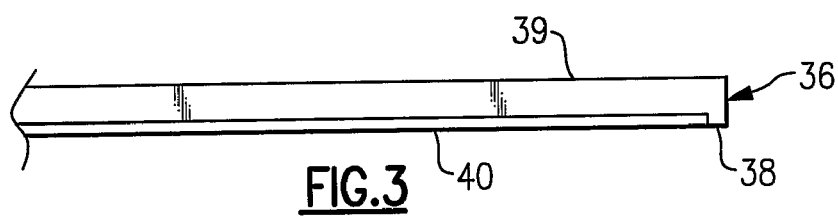
FIG. 3 schematically illustrates an example fabric layer.

The sliding fabric layer 36 of one example embodiment is shown in FIG. 3. In this example, the sliding fabric layer 36 has one side 38 and an oppositely facing side 39. The sliding fabric layer 36 comprises cotton in one example. In another example, the sliding fabric layer 36 comprises polyester.

As can be appreciated from FIG. 3, one side 38 of the example sliding fabric layer 36 has a coating 40 applied to at least a portion of the one side 38. The coating 40 is a low friction coating that establishes a low coefficient of friction between sliding fabric layer 36 and the handrail guidance.

Different example embodiments of this invention include different materials used for establishing the low friction coating 40. Example low-friction materials are curable, thermoplastic or solvent based. Example coating materials include epoxy, fluoroepoxy, polyester, polyamide, polyurethane and silicone. The selected material in some examples establishes a flexible coating that has a firm outer skin to present a non-sticky surface over the entire operating range of the handrail 30 to promote low friction. Some example coatings include friction reducing additives such as tetrapolyfluoroethylene, a solid fluoropolymer, a low vapor pressure fluid fluoropolymer, a fatty acid, a fatty acid derivative (including but not limited to stearates, laurates or palmitates), graphite or molybdenum disulphide. In one example, a friction reducing additive is disbursed throughout the material used to establish the low friction coating 40.

Figure 4:
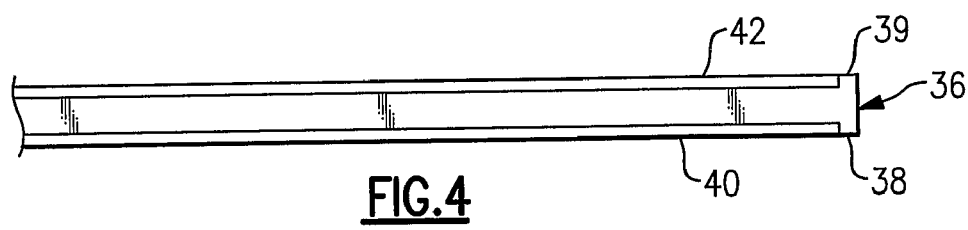
FIG. 4 schematically illustrates another embodiment of an example sliding fabric layer.

FIG. 4 shows another embodiment of a sliding fabric layer 36 having the one side 38 coated with the coating 40 and an oppositely facing side 39 coated with another coating 42. As in the previous example, the coating 40 comprises a low friction coating to establish a low coefficient of friction between the sliding fabric layer 36 and the guidance over which the handrail will travel. The coating 42 in this example comprises a different material selected to enhance bonding between the sliding fabric layer 36 and the material selected to establish the body of the handrail 30.

In another example, the coating 40 and the coating 42 comprise the same material. In such an example, a material is selected that will provide a low coefficient of friction on the side 38 and will not interfere with bonding between the fabric layer 36 and the material selected to establish the body of the handrail. In some examples, the coating 42, even though it provides a low friction coating on the side 38, enhances the ability to bond the sliding fabric 36 to the body of the handrail.

Depending on the configuration of the handrail and the driving mechanism used to propel the handrail during the passenger conveyor operation, different patterns of applying a low friction coating to the one side 38 of the fabric layer 36 may be used.

Figure 5:
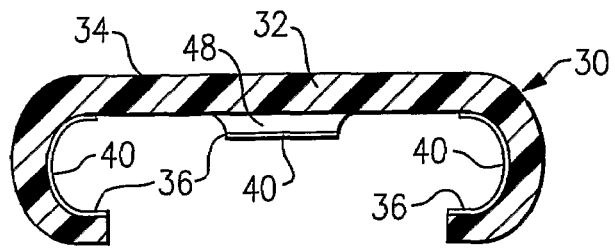
FIG. 5 is a cross-sectional illustration of another embodiment taken along the lines A-A in FIG. 1.

FIG. 5 shows one example embodiment of a handrail 30 that includes a plurality of teeth 48 that are engaged by a driving mechanism that does not require pinching the handrail such that it does not rely on friction between the driving mechanism and a sliding fabric layer 36 that is on an end surface of each tooth 48. In such an example, the low friction coating 40 extends across the entire one side 38 of the sliding fabric layer 36. In the example of FIG. 5, the low friction coating 40 extends across the entire one side 38 of each portion of the sliding fabric 36 shown in the illustration.

Figure 6:
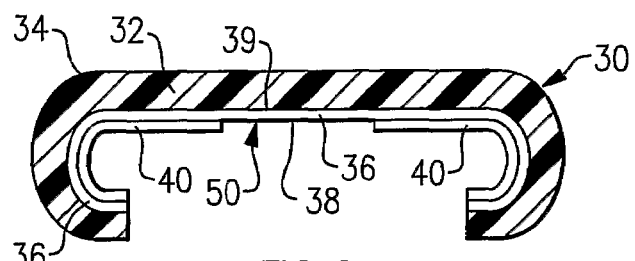
FIG. 6 is a cross-sectional illustration of another embodiment taken from the same perspective as FIGS. 2 and 5.

FIG. 6 schematically shows another example embodiment where a traditional handrail driving mechanism relies upon friction between the sliding fabric layer 36 and the drive mechanism for propelling the handrail 30 as desired. In this example, the low friction coating 40 is applied in a manner to establish at least two laterally spaced stripes that extend longitudinally along a length of the sliding fabric layer 36 (e.g., into the page in the illustration). A central portion 50 of the one side 38 remains uncoated to be engaged by the handrail driving mechanism. The coated portions having the low friction coating 40 will provide a better coefficient of friction between the sliding layer 36 and the handrail guidance while the uncoated portion 50 facilitates appropriate frictional engagement with the driving mechanism.

Figure 7:
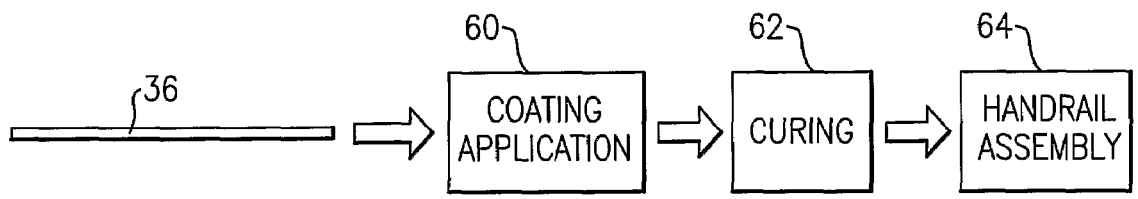
FIG. 7 schematically illustrates an example method of applying a coating to a handrail layer in one embodiment of this invention.

FIG. 7 schematically illustrates one example method of making a handrail assembly including a sliding fabric layer having a low friction coating. Material stock for the sliding fabric layer 36 moves through a coating application station 60 in an automated fashion. In this example, the sliding fabric layer 36 is coated before it is secured to a remainder of a handrail. In this example, the coating application station applies the coating in one of several ways. For embodiments having only one side of the fabric layer 36 coated with a low friction coating 40, the coating application station 60 includes appropriate machinery for brushing on, spraying on or rolling on the low friction coating material. In another example where both sides of the fabric layer 36 are coated with the same coating material, the fabric layer is immersed in a bath of uncured material used to establish the low friction coating.

Regardless of the technique for applying the coating, the example of FIG. 7 includes a curing station 62 that includes an appropriate heat source, a dryer or both for curing the material used to establish the low friction coating 40. Depending on the particular coating material selected, appropriate curing techniques will be employed to establish good adhesion between the low friction coating material and the sliding fabric layer. The result of the curing in some examples is a flexible coating layer with a firm, tack free outer skin that provides the desired coefficient of friction between the coating layer 40 and the guidance eventually used for guiding movement of the handrail to which the sliding fabric layer 36 will be applied. The example of FIG. 7 includes a handrail assembly station 64 where the coated sliding fabric layer 36 is secured to a remainder of the handrail.

Figure 8:
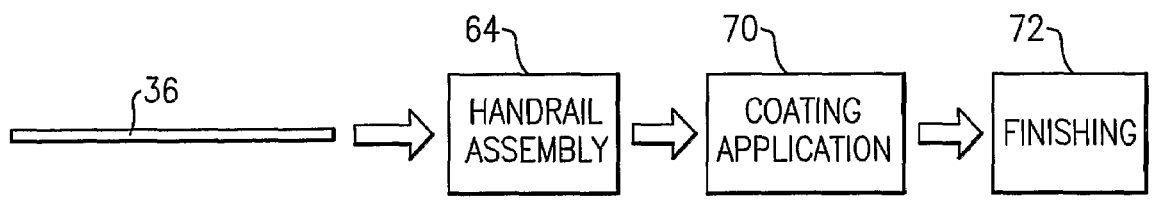
FIG. 8 schematically illustrates another example method.

In the example of FIG. 8, the sliding fabric layer 36 is secured to a remainder of the handrail in a handrail assembly station 64 before the low friction coating 40 is applied to the sliding fabric layer 36. In such an arrangement, only one side of the sliding fabric layer 36 will typically be coated as the layer 36 is already secured to the body 32 of the handrail 30 before the coating is applied. One example includes coating the side 39 of the example sliding fabric layer 36, then securing the fabric layer 36 to the handrail body and subsequently applying the low friction coating 40 to the one side 38 of the sliding fabric layer 36.

In the example of FIG. 8, the low friction coating 40 is applied in a coating application station 70. Brushing or rolling techniques for applying the coating in such an example provide the advantage of not having to mask off portions of the handrail that should not be coated if a spraying application technique were used, for example. One example includes extruding the low friction coating material 40 onto the sliding fabric layer 36. In one example, such extrusion occurs as the handrail body material is extruded such that there is no physical distinction between the handrail assembly station 66 and the coating application station 70, which are shown schematically separate for discussion purposes. In such an example, different portions of machinery working at the same time provide the desired results.

Once the coating 40 is appropriately applied, a finishing station 72 cures the material of the coating 40 and completes any finishing required of the handrail material.

The disclosed examples have a variety of advantages compared to previous handrail designs. Using a low-friction coating 40 reduces the coefficient of friction as the handrail slides along a guidance. This provides extended handrail life. As the coefficient of friction is a dominant factor influencing a handrail's service life, reducing the coefficient of friction using an example embodiment of this invention extends that life and provides significant cost savings. Another advantage to the disclosed examples is they allow for reduced power consumption for moving the handrail. A lower coefficient of friction allows for using less power to move the handrail as desired. Another advantage is that there is less heat generation at the sliding surface, which provides better temperature control over the handrail and may allow for using less expensive materials in some instances.

Another advantage includes reducing the complexity of a handrail guidance arrangement. Many conventional systems include rollers associated with newels to reduce frictional force at the location of the newels. Adding such rollers increases the complexity and expense of the passenger conveyor assembly. Reducing a coefficient of friction using a low-friction coating 40 allows for eliminating such rollers without any adverse effects, which provides cost savings from a material and installation standpoint.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An article useful as at least a portion of a passenger conveyor handrail, comprising:
    a sliding fabric layer having at least a portion of one side coated with a low friction coating wherein the low friction coating comprises at least one of tetrafluoropolyethylene, a solid flouropolymer, a low vapor pressure fluid flouropolymer, a fatty acid, a fatty acid derivative, graphite or molybdenum disulphide.

2. The article of claim 1, wherein the sliding fabric layer has a first side coated with the low friction coating and a second side facing in an opposite direction that is coated with a coating.

3. The article of claim 2, wherein the coating on the second side is the same as the low friction coating on the first side.

4. The article of claim 2, wherein the coating on the second side is different than the low friction coating on the first side.

5. The article of claim 1, wherein the low friction coating comprises at least one of tetrafluoropolyethylene, a solid flouropolymer, a low vapor pressure fluid flouropolymer, a fatty acid, a fatty acid derivative, graphite or molybdenum disulphide.

6. The article of claim 1, wherein the sliding fabric layer comprises at least one of cotton or polyester.

7. An article useful as at least a portion of a passenger conveyor handrail, comprising:
    a sliding fabric layer having at least a portion of one side coated with a low friction coating wherein the low friction coating is flexible and includes a firm outer skin.

8. An article useful as at least a portion of a passenger conveyor handrail, comprising:
    a sliding fabric layer having at least a portion of one side coated with a low friction coating wherein the low friction coating comprises at least one of an epoxy, a fluoroepoxy, a polyester, a polyamide, a polyurethane or a silicone.

9. An article useful as at least a portion of a passenger conveyor handrail, comprising:
    a sliding fabric layer having at least a portion of one side coated with a low friction coating wherein the low friction coating comprises laterally spaced coated portions on the one side and wherein the one side comprises a central, uncoated section between the laterally spaced coated portions.

10. A method of making at least a portion of a passenger conveyor handrail, comprising:
    applying a low friction coating to at least a portion of one side of a sliding fabric layer by at least one of brushing, spraying or rolling on the low friction coating.

11. The method of claim 10, comprising
    applying the low friction coating before securing the sliding fabric to a body portion of a handrail.

12. The method of claim 10, comprising
    applying the low friction coating after securing the sliding fabric to a body portion of a handrail.

13. The method of claim 10, comprising applying the low friction coating to the entire one side of the sliding fabric layer.

14. The method of claim 10, comprising
    applying a coating to a second, oppositely facing side of the sliding fabric layer.

15. The method of claim 14, comprising
    applying the same coating to the one side and the second side.

16. The method of claim 15, comprising
    immersing the sliding fabric layer in a material for establishing the low friction coating.

17. A method of making at least a portion of a passenger conveyor handrail, comprising:
    applying a low friction coating to at least a portion of one side of a sliding fabric layer comprising establishing at least two laterally spaced portions of the low friction coating on the one side and leaving a central section of the one side uncoated.

18. A method of making at least a portion of a passenger conveyor handrail, comprising:
    applying a low friction coating to at least a portion of one side of a sliding fabric layer;
    applying a coating to a second, oppositely facing side of the sliding fabric layer; and
    applying different coatings to the one side and the second side, respectively.

19. A method of making at least a portion of a passenger conveyor handrail, comprising:
    applying a low friction coating to at least a portion of one side of a sliding fabric layer by extruding the low friction coating onto the one side of the sliding fabric layer.

* * * * *